No. 893,291. PATENTED JULY 14, 1908.
W. J. WILLIAMSON & J. P. KLINCHAW.
ROLLER SKATE.
APPLICATION FILED APR. 2, 1908.
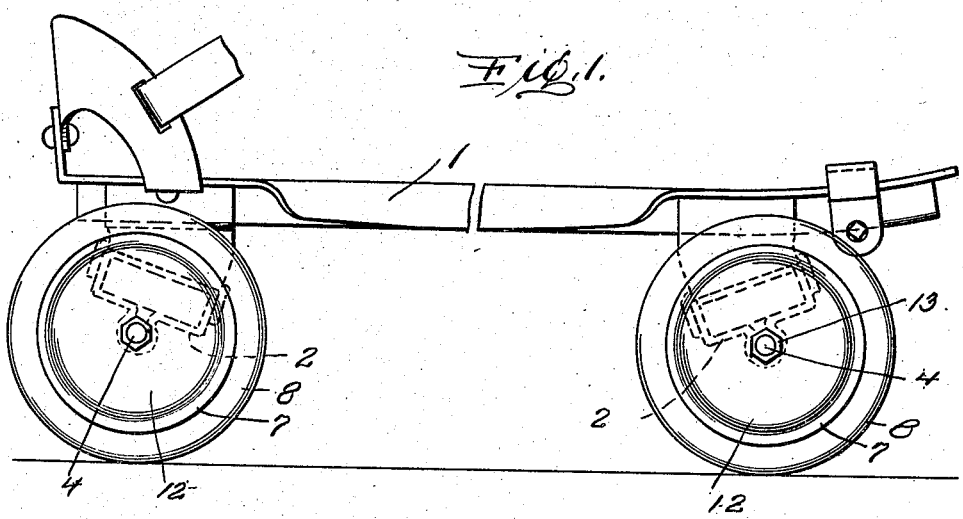
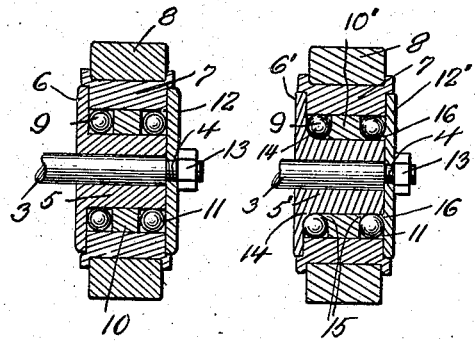 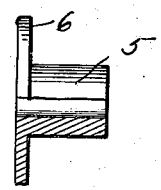

UNITED STATES PATENT OFFICE.

WILLIAM J. WILLIAMSON AND JOHN P. KLINCHAW, OF ALIQUIPPA, PENNSYLVANIA.

ROLLER-SKATE.

No. 893,291.     Specification of Letters Patent.     Patented July 14, 1908.

Application filed April 2, 1908. Serial No. 424,720.

*To all whom it may concern:*

Be it known that we, WILLIAM J. WILLIAMSON and JOHN P. KLINCHAW, citizens of the United States of America, residing at Aliquippa, in the county of Beaver and State of Pennsylvania, have invented certain new and useful Improvements in Roller-Skates, of which the following is a specification, reference being had therein to the accompanying drawing.

This invention relates to roller skates, and the objects of our invention are, first, to provide a novel bearing for the rollers or wheels of a skate; second, to eliminate the noise incurred by a skate in use, and third, to provide a simple, durable and strong roller skate.

We attain the above objects by providing the wheels or rollers of a skate with ball bearings distributed to relieve the friction between a wheel and its support.

The detail construction entering into our invention will be presently described and then specifically pointed out in the appended claims.

Referring to the drawing forming part of this specification, Figure 1 is a side elevation of a skate, partly broken away. Fig. 2 is a vertical sectional view of one of the wheels or rollers thereof. Fig. 3 is a similar view illustrating a slight modification of our invention. Fig. 4 is a side elevation of a bearing hub, partly broken away and partly in section, and Fig. 5 is a sectional view of a hub ring.

In the accompanying drawings 1 designates the body of a conventional form of skate, this body being provided with depending bearings 2 for axles 3, said axles having reduced threaded ends 4.

Upon the ends of the axles 3 are shrunk or fixed hubs 5 having annular flanges 6 for supporting the rim or felly 7 of the wheel, said rim or felly having a suitable tire 8.

Between the hub 5 and the rim 7 is mounted a plurality of antifriction balls 9, and then a hub ring 10 is placed in position and another lot of antifriction balls 11, said balls being retained in place by a plate 12 secured upon the reduced end 4 of the axle 3 by a nut 13. The plate 12 is the same diameter as the flanged end of the hub 5, whereby the rim of the wheel will be firmly supported.

In Fig. 3 of the drawings, we have illustrated a slight modification of our invention, wherein a fillet 14 is formed at the juncture of flange 6' and the hub 5', the ring 10' is provided with an annular fillet 15, and the plate 12' with an annular fillet 16. These fillets provide races for the antifriction balls 9 and 11, and as the parts of the wheel or roller become worn, the plate 12' can be tightened to take up the wear and tear.

Having now described our invention what we claim as new, is:—

In a roller skate, the combination with an axle, of hubs mounted upon the ends of said axle, a flange carried by each hub, a ring mounted upon each hub, antifriction balls interposed between said ring and said flange, a plate secured upon each end of said axle, antifriction balls interposed between said ring and said plate, a rim revolubly supported by said antifriction balls, and a tire mounted upon said rim, substantially as and for the purpose described.

In testimony whereof we affix our signatures in the presence of two witnesses.

WILLIAM J. WILLIAMSON.
    JOHN P. KLINCHAW.

Witnesses:
   MAX H. SROLOVITZ,
   K. H. BUTLER.